(12) United States Patent
Agarwal et al.

(10) Patent No.: US 9,880,664 B2
(45) Date of Patent: Jan. 30, 2018

(54) COMMON PIXEL CORRECTION FOR SENSOR PANELS

(71) Applicant: Apple Inc., Cupertino, CA (US)

(72) Inventors: Manu Agarwal, Redwood City, CA (US); Jason C. Hu, Palo Alto, CA (US); Dhaval Patel, San Jose, CA (US); Shahrooz Shahparnia, Monte Sereno, CA (US); Sumant Ranganathan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 14/864,351

(22) Filed: Sep. 24, 2015

(65) Prior Publication Data

US 2017/0090668 A1    Mar. 30, 2017

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01); *G06F 2203/04106* (2013.01)

(58) Field of Classification Search
CPC ....... G06F 3/0418; G06F 3/0414; G06F 3/044
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Ricardo L Osorio
(74) *Attorney, Agent, or Firm* — Morrison & Foerster LLP

(57) ABSTRACT

Noise in sensor panel measurements can be reduced using a common pixel correction algorithm. Noise can be introduced into touch or force sensor panel measurements, for example, by circuitry of a transmit (Tx) section or a receive (Rx) section coupled to one or more sensing nodes of a sensor panel. For example, a digital-to-analog converter in the transmit section or an analog-to-digital converter in the receive section can introduce low-frequency correlated noise. Additionally, transmit and receive sections can introduce uncorrelated noise into the system. Reference nodes, coupled between Tx and Rx sections, can sense correlated and uncorrelated noise from the Tx and Rx sections. The noise measured at reference nodes can be subtract from signals measured at other sensing nodes coupled to the same Rx channel. The measurement at the reference node can be scaled using a scaling parameter to account for differences between reference nodes and sensing nodes.

25 Claims, 13 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 9,069,408 B2* | 6/2015 | Hotelling .............. G06F 3/0416 |
| 2006/0197753 A1 | 9/2006 | Hotelling |
| 2010/0060593 A1* | 3/2010 | Krah ..................... G06F 3/0416 345/173 |
| 2012/0050206 A1* | 3/2012 | Welland ................. G06F 3/044 345/174 |
| 2013/0176269 A1* | 7/2013 | Sobel .................... G06F 3/0416 345/174 |
| 2013/0176273 A1* | 7/2013 | Li .......................... G06F 3/044 345/174 |
| 2015/0261340 A1* | 9/2015 | Krah ...................... G06F 3/044 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

|  | $RX_0$ | $RX_1$ | $RX_2$ | $RX_3$ | $RX_4$ | $RX_5$ | $RX_6$ | $RX_7$ | SUM |
|---|---|---|---|---|---|---|---|---|---|
| $TX_0$ | $\sigma$ | $\sigma$ | $\sigma$ | $-3\sigma$ | $\sigma$ | $-3\sigma$ | $\sigma$ | $\sigma$ | $= 0\sigma$ |
| $TX_1$ | $\sigma$ | $\sigma$ | $-3\sigma$ | $\sigma$ | $\sigma$ | $\sigma$ | $-3\sigma$ | $\sigma$ | $= 0\sigma$ |
| $TX_2$ | $\sigma$ | $\sigma$ | $\sigma$ | $\sigma$ | $-3\sigma$ | $\sigma$ | $\sigma$ | $-3\sigma$ | $= 0\sigma$ |
| $TX_3$ | $-3\sigma$ | $-3\sigma$ | $\sigma$ | $\sigma$ | $\sigma$ | $\sigma$ | $\sigma$ | $\sigma$ | $= 0\sigma$ |

*FIG. 12*

|  | $RX_0$ | $RX_1$ | $RX_2$ | $RX_3$ | $RX_4$ | $RX_5$ | $RX_6$ | $RX_7$ | SUM |
|---|---|---|---|---|---|---|---|---|---|
| $TX_0$ | $\sigma$ | $\sigma$ | $\sigma$ | $\sigma$ | $\sigma$ | $\sigma$ | $\sigma$ | $\sigma$ | $= 8\sigma$ |
| $TX_1$ | $\sigma$ | $\sigma$ | $\sigma$ | $\sigma$ | $\sigma$ | $\sigma$ | $\sigma$ | $\sigma$ | $= 8\sigma$ |
| $TX_2$ | $\sigma$ | $\sigma$ | $\sigma$ | $\sigma$ | $\sigma$ | $\sigma$ | $\sigma$ | $\sigma$ | $= 8\sigma$ |
| $TX_3$ | $-3\sigma$ | $-3\sigma$ | $-3\sigma$ | $-3\sigma$ | $-3\sigma$ | $-3\sigma$ | $-3\sigma$ | $-3\sigma$ | $= -24\sigma$ |

| | RX$_0$ | RX$_1$ | ... | RX$_{14}$ | RX$_{15}$ |
|---|---|---|---|---|---|
| TX$_0$ | BANK1 | BANK1 | BANK1 | BANK1 | BANK1 |
| TX$_1$ | BANK1 | BANK1 | BANK1 | BANK1 | BANK1 |
| TX$_2$ | BANK1 | BANK1 | BANK1 | BANK1 | BANK1 |
| TX$_3$ | BANK2 | BANK2 | BANK2 | BANK2 | BANK2 |
| TX$_4$ | BANK2 | BANK2 | BANK2 | BANK2 | BANK2 |
| TX$_5$ | BANK2 | BANK2 | BANK2 | BANK2 | BANK2 |
| TX$_6$ | BANK3 | BANK3 | BANK3 | BANK3 | BANK3 |
| TX$_7$ | BANK3 | BANK3 | BANK3 | BANK3 | BANK3 |
| TX$_8$ | BANK3 | BANK3 | BANK3 | BANK3 | BANK3 |
| TX$_9$ | BANK4 | BANK4 | BANK4 | BANK4 | BANK4 |
| TX$_{10}$ | BANK4 | BANK4 | BANK4 | BANK4 | BANK4 |
| TX$_{11}$ | BANK4 | BANK4 | BANK4 | BANK4 | BANK4 |
| TX$_{12}$ | BANK5 | BANK5 | BANK5 | BANK5 | BANK5 |
| TX$_{13}$ | BANK5 | BANK5 | BANK5 | BANK5 | BANK5 |
| TX$_{14}$ | BANK5 | BANK5 | BANK5 | BANK5 | BANK5 |
| TX$_{15}$ | ALL | ALL | ALL | ALL | ALL |

*FIG. 14*

COMMON PIXEL CORRECTION FOR SENSOR PANELS

FIELD OF THE DISCLOSURE

This relates generally to devices including a sensor panel and, more specifically, to touch-sensitive and/or force-sensitive devices implementing algorithms to reduce noise levels.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event. Touch sensing measurements, however, can be degraded by noise.

BRIEF SUMMARY OF THE DISCLOSURE

This relates to reducing noise in sensor panel measurements. Noise can be introduced into touch or force sensor panel measurements, for example, by circuitry of a transmit (Tx) section or a receive (Rx) section coupled to one or more sensing nodes of a sensor panel. For example, a digital-to-analog converter (DAC) in the transmit section or an analog-to-digital converter (ADC) in the receive section can introduce low-frequency correlated noise. Additionally, transmit and receive sections can introduce uncorrelated noise into the system. Reference nodes, coupled between Tx and Rx sections, can sense correlated and uncorrelated noise contributions from the Tx and Rx sections. The noise measured at reference nodes can be subtracted from signals measured at other sensing nodes coupled to the same Rx channel. In some examples, the measurement at the reference node can be scaled using a scaling parameter to account for differences between reference nodes and sensing nodes.

BRIEF DESCRIPTION OF THE DRAWINGS

FIG. 12 illustrates thermal noise contributions at nodes of the example touch sensor panel illustrated in FIG. 9 according to examples of the disclosure.

FIG. 13 illustrates thermal noise contributions at nodes of the example touch sensor panel illustrated in FIG. 11A according to examples of the disclosure.

FIG. 14 illustrates an example touch sensor panel for implementing a common pixel correction algorithm using banked scans according to examples of the disclosure.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to reducing noise in sensor panel measurements (e.g., mutual capacitance based touch and/or force sensor panels). Noise can be introduced into touch or force sensor panel measurements, for example, by circuitry of a transmit (Tx) section or a receive (Rx) section coupled to one or more sensing nodes of a sensor panel. For example, a digital-to-analog converter (DAC) in the transmit section or an analog-to-digital converter (ADC) in the receive section can introduce low-frequency correlated noise. Additionally, transmit and receive sections can introduce uncorrelated noise into the system. Reference nodes, coupled between Tx and Rx sections, can sense correlated and uncorrelated noise contributions from the Tx and Rx sections. The noise measured at reference nodes can be subtracted from signals measured at other sensing nodes coupled to the same Rx channel. In some examples, the measurement at the reference node can be scaled using a scaling parameter to account for differences between reference nodes and sensing nodes. Although the common pixel correction algorithm is discussed herein with reference to mutual capacitance based touch sensor panels, it should be understood that the principles of applying correction algorithm can be applied to different types of sensors, including touch sensors, force sensors and the like. The different types of sensors can be based on different sensing techniques including mutual capacitance, self-capacitance and resistive sensing techniques.

Figure 1A:
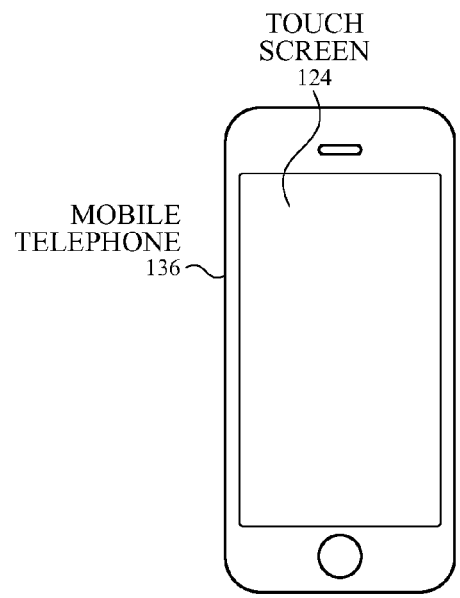
FIGS. 1A-1D illustrate example systems that can implement a noise correction algorithm according to examples of the disclosure.
Figure 1B:
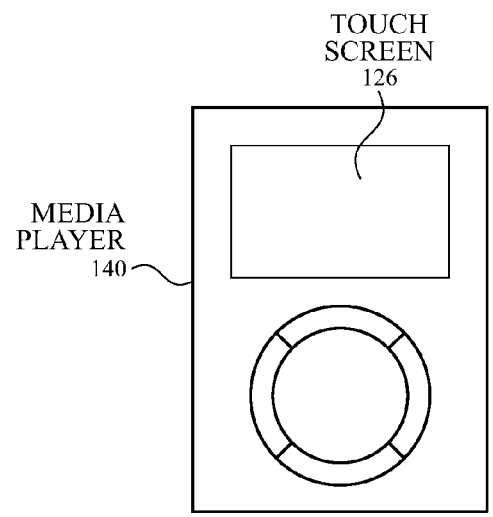
Figure 1C:
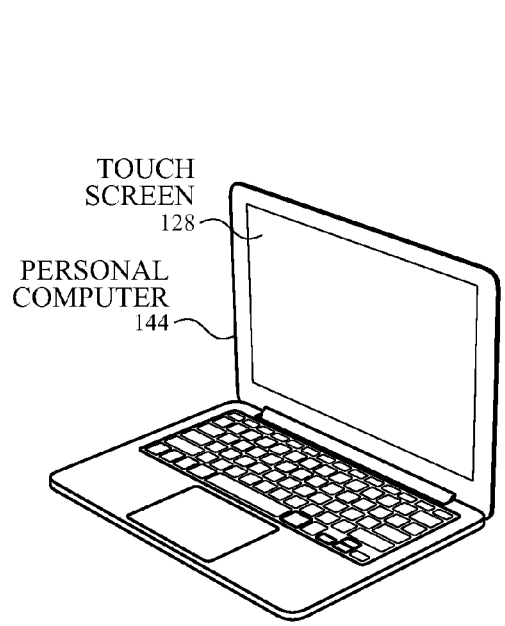
Figure 1D:
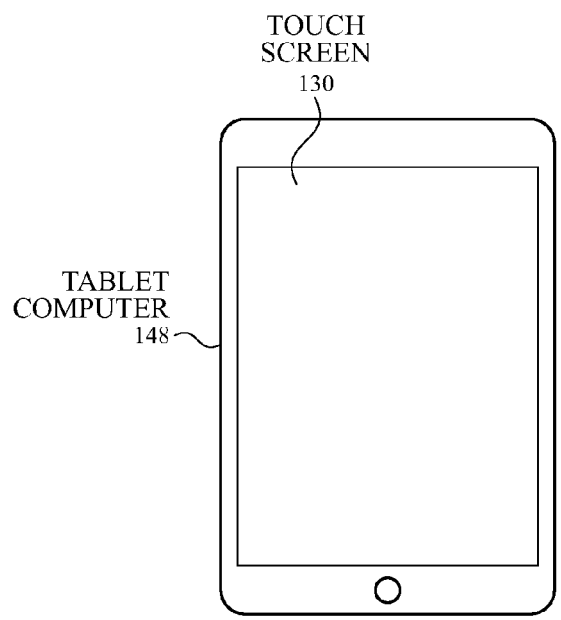

FIGS. 1A-1D illustrate example systems that can implement a noise correction algorithm according to examples of the disclosure. FIG. 1A illustrates an example mobile telephone 136 that includes a touch screen 124 and other computing system blocks that can implement a noise correction algorithm according to examples of the disclosure. FIG. 1B illustrates an example digital media player 140 that includes a touch screen 126 and other computing system blocks that can implement a noise correction algorithm according to examples of the disclosure. FIG. 1C illustrates an example personal computer 144 that includes a touch screen 128 and other computing system blocks that can implement a noise correction algorithm according to examples of the disclosure. FIG. 1D illustrates an example tablet computing device 148 that includes a touch screen 130 and other computing system blocks that can implement a noise correction algorithm according to examples of the disclosure. The touch screen and computing system blocks that can implement a noise correction algorithm can be implemented in other devices including wearable devices.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
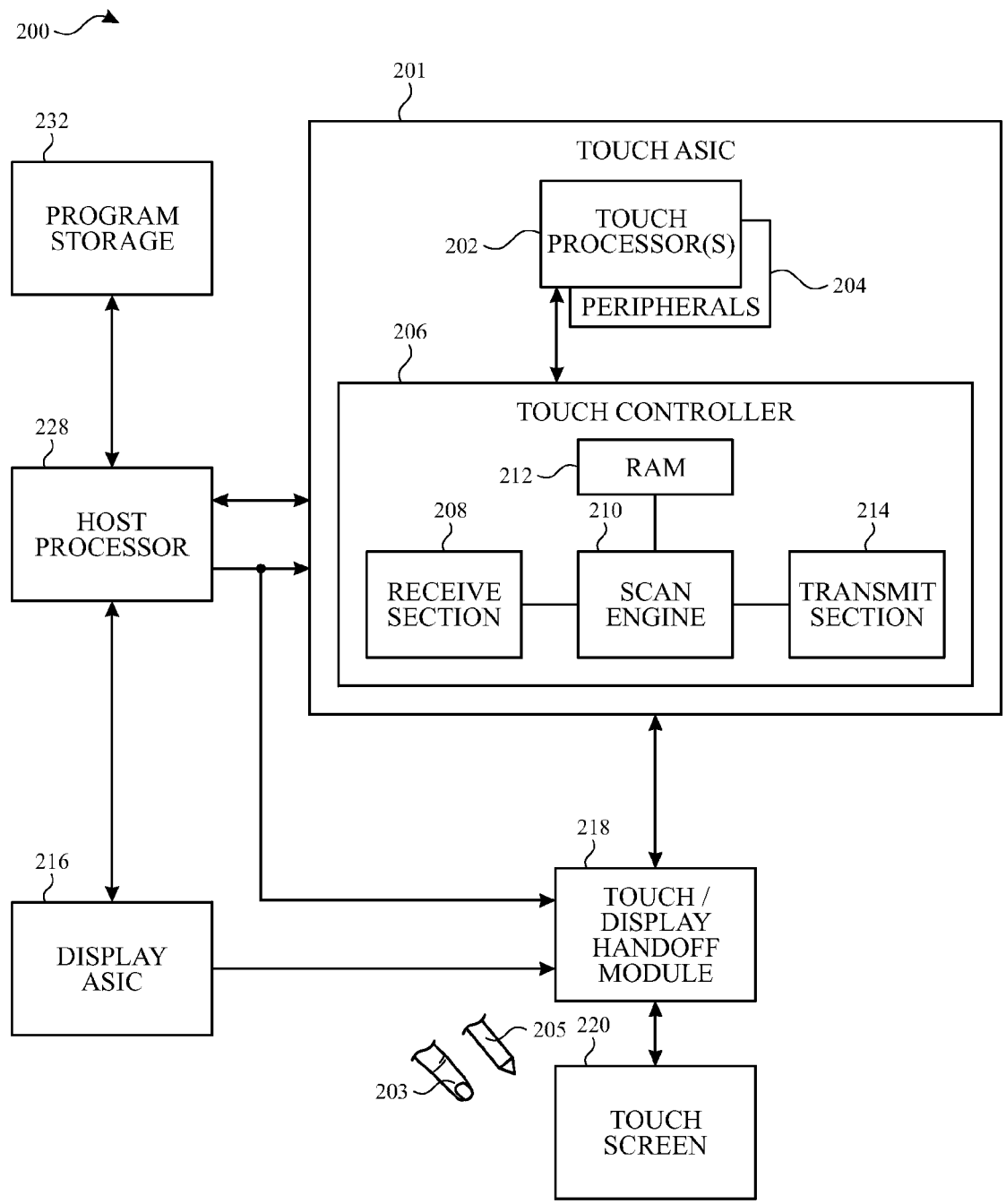
FIG. 2 illustrates a block diagram of an example computing system that can implement a noise correction algorithm according to examples of the disclosure.

FIG. 2 illustrates a block diagram of an example computing system that can implement a noise correction algorithm according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive section 208, panel scan engine 210 (which can include channel scan logic) and transmit section 214 (which can include analog or digital driver logic). In some examples, the transmit section 214 and receive section 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit section and receive section for the specific scan event to be performed. Results (e.g., touch signals or touch data) from the various scans can also be stored in RAM 212. In addition, panel scan engine 210 can provide control for transmit section 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
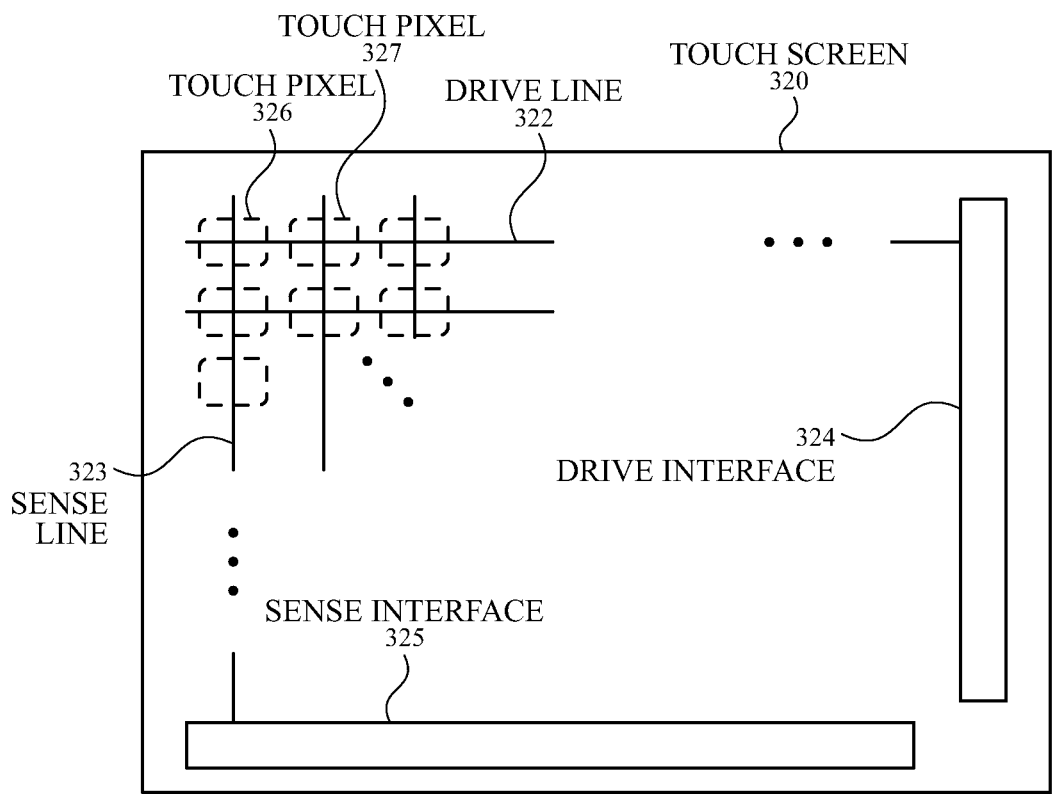
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit section 214 through a drive interface 324, and resulting sense signals generated in sense lines 323 can be transmitted through a sense interface 325 to sense channels in receive section 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
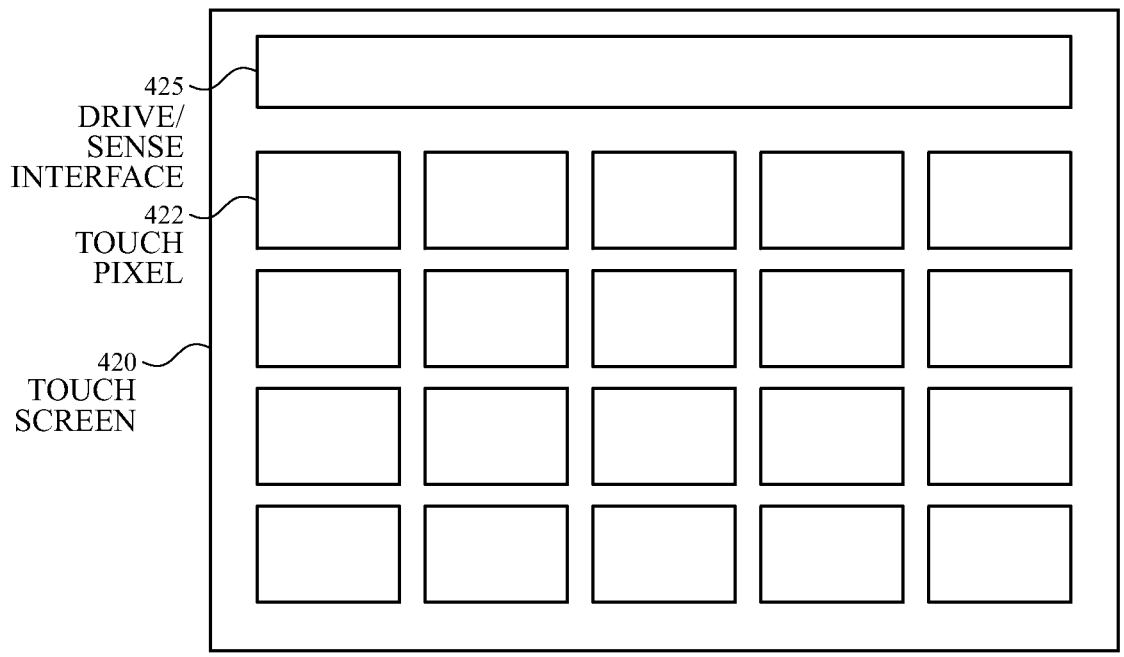
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive section 208 in touch controller 206, can be driven by stimulation signals from the sense channels (or transmit section 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance. Although discussed herein with reference to a row-column touch sensor panel, the principles of the common pixel correction algorithm can be applied to a pixelated touch sensor panel configured to detect mutual capacitance. Additionally, although discussed herein with reference to mutual capacitance based touch sensor panels, the principles of the common pixel correction algorithm can be applied to other capacitance based touch sensor panels (e.g., self-capacitance based touch sensor panels), resistive touch sensor panels, and other types of touch sensor panels. Additionally, it should be understood that a force sensor panel can also be implemented using mutual capacitance sensing techniques. In some examples, force sensor panel can measure mutual capacitance between electrodes mounted on the backplane of the display and electrodes mounted on a proximate flex circuit. As force is exerted, the distance between the electrodes mounted on the backplane of the display and electrodes mounted on a proximate flex circuit can change the mutual capacitance coupling therebetween. The change in mutual capacitance can be measured to detect force applied to the touch screen.

Figure 5:
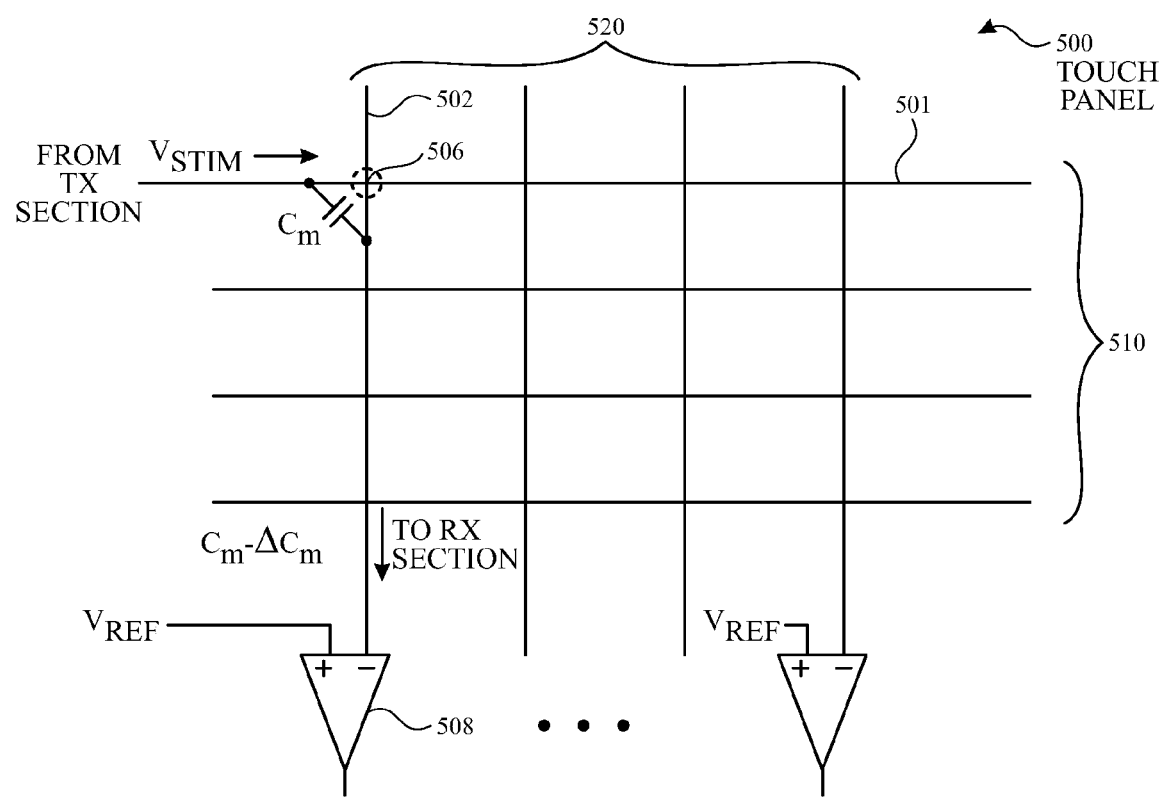
FIG. 5 illustrates an example mutual capacitance scan of an example row-column touch sensor panel.

FIG. 5 illustrates an example mutual capacitance scan of an example row-column touch sensor panel. Touch sensor panel 500 can include an array of touch nodes formed at the crossing points of row traces 510 and column traces 520. For example, touch node 506 can be formed at the crossing point of row trace 501 and column trace 502. During a single stimulation mutual capacitance scan, a row trace 501 (acting as a drive line) can be coupled to the transmit section 214 which can stimulate the row trace 501 with a drive signal ("Vstim"). One or more column traces (acting as sense lines) can be coupled to the receive section 208 to transmit mutual capacitance signals coupled from the row trace 501 thereto. For each step of the single stimulation mutual capacitance scan, one row trace can be stimulated and the one or more column traces can be sensed. A touch node 506 can have a mutual capacitance Cm at the touch node 506 when there is no object touching or hovering over to touch node 506. When an object touches or hovers over the touch node 506 (e.g., a finger or a passive stylus), the mutual capacitance Cm can be reduced by ΔCm, i.e., (Cm−ΔCm), corresponding to the amount of charge shunted through the object to ground. This mutual capacitance change can be transmitted to sense amplifier 508 in the receive section 208, which can be coupled to the column trace 502 corresponding to touch node 506, to sense a touch value that can be used to indicate the touch or hover event at touch node 506. The sensing described with respect to touch node 506 can be repeated for the nodes of the touch sensor panel to generate an image of touch for the touch sensor panel.

In some examples, rather than using a single stimulation mutual capacitance scan, the row-column touch sensor panel can be stimulated using a multi-stimulation (multi-stim) mutual capacitance scan. In multi-stim scan, a plurality of drive lines (e.g., row traces 510) can be stimulated simultaneous with different stimulation signals for a plurality of stimulation steps and the sense signals generated at a plurality of sense lines (e.g., column traces 520) in response to the plurality of stimulation steps can be processed to determine the presence and/or amount of touch for each touch node in the touch sensor panel (corresponding to the plurality of drive lines). For example, the phases of the drive signals applied to the drive lines can be different during each stimulation step and the sensed signals can be demodulated and decoded based on the stimulation phases. The demodulation and decoding process can generate touch values for each touch node of the touch sensor panel scanned during the multi-stim scan. A detailed discussion of multi-stimulation touch sensing can be found in U.S. Pat. No. 7,812,827 entitled "Simultaneous Sensing Arrangement" by Steve Hotelling, et al. (filed 3 Jan. 2007) and incorporated by reference herein.

Figure 6:
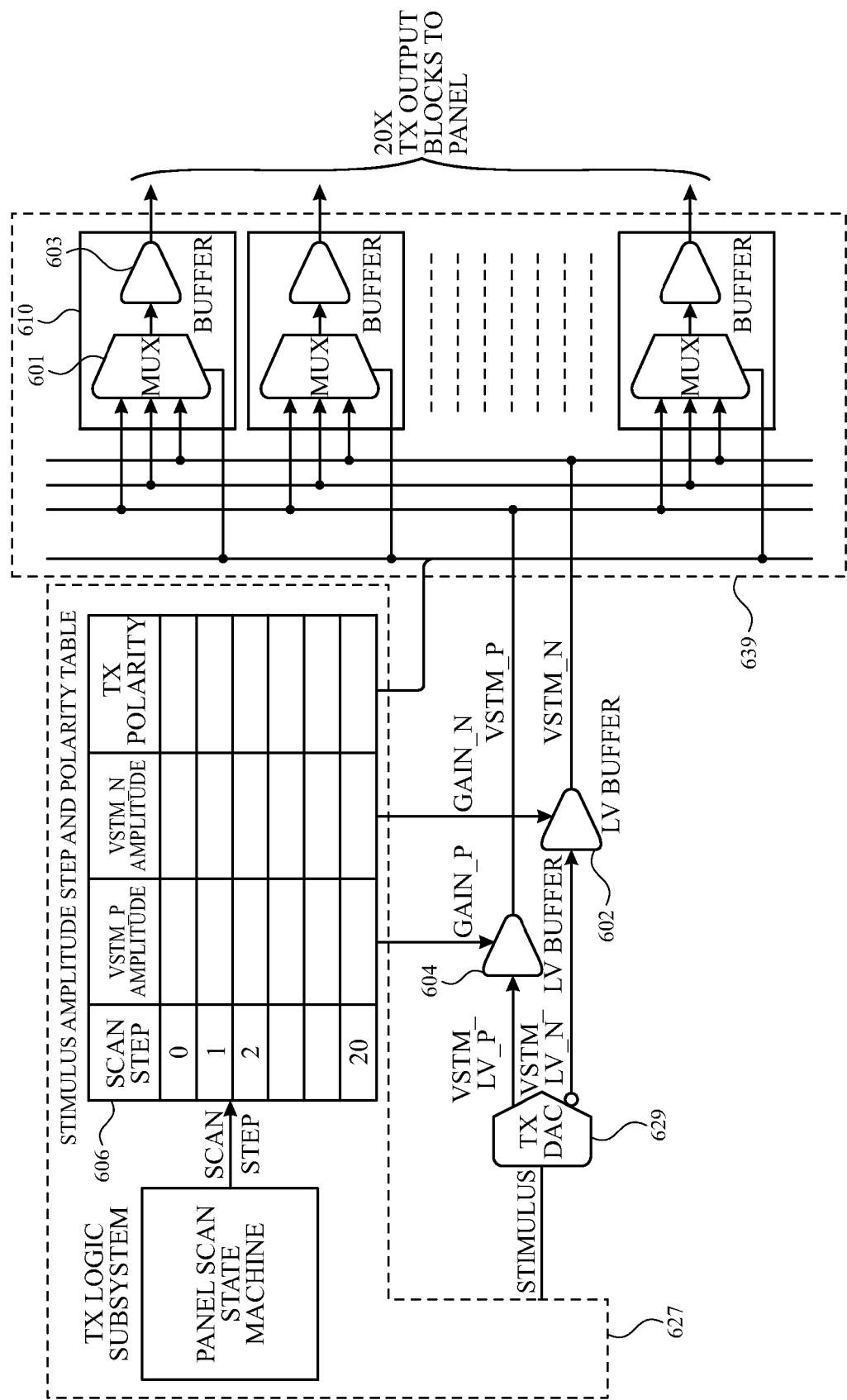
FIG. 6 illustrates an example of circuitry of a transmit section that can be used for multi-stim scans according to examples of the disclosure.

FIG. 6 illustrates an example of circuitry of a transmit section that can be used for multi-stim scans according to examples of the disclosure. The transmit section generates stimulation signals applied to the touch sensor panel based on, for example, a transmit numerically controlled oscillator (Tx NCO) that can be coupled to or can be part of the transmit section. The signal from the Tx NCO can be converted into a digital signal (and otherwise processed) by transmit logic (Tx logic) 627. It should be noted, that the functions of Tx logic described herein can alternatively be performed by logic in the scan engine 210 and/or transmit section 214. A differential Tx DAC 629 can receive the digital signals from Tx logic 627 and can generate stimulation signals Vstim+ and Vstim−, which can correspond to stimulation signals that are 180° out of phase (e.g., Vstim+ with 0° phase and Vstim− with 180° phase). Vstim+ can be a signal having a waveform at the same frequency as Tx NCO, and Vstim− can be a signal with the waveform of Vstim+ that can be inverted about a common voltage Vcm. The different polarity stimulation signals can be applied to the drive lines of the touch sensor panel during steps of the multi-stim scan. The use of a single Tx DAC 629 together with analog bus 639 and multiple Tx out blocks 610 can reduce the touch ASIC footprint versus other designs, while allowing stimulation signals of different phases to be generated. However, more than one Tx DAC 629 could be used and single ended DACs could be used as well. Tx DAC 629 can be, for example, an R2-R DAC, a thermometer coded DAC, a sigma-delta DAC, or other suitable DAC.

The transmit section can also include multiple Tx output blocks (transmit channels). Each Tx output block 610 can include a multiplexer (MUX) 601 and a buffer 603. The MUX 601 in a Tx output block 610 can include inputs from lines of analog bus 639. Bus 639 can include lines having different polarity stimulation signals (e.g., Vstim+ and Vstim−) and can also include a line carrying the common voltage (Vcm) and a line that can be coupled to a system ground. Analog MUX 601 can be connected to each line of bus 639, and can select one of the drive signals from the lines of bus 639 to supply to buffer 603. MUX 601 can select a drive signal based on control signals from Tx logic 627. For example, data stored in memory (e.g., RAM 212) can be used to select the drive signal according to the drive line and drive step of the multi-stim scan. In some examples, the data stored in memory for the multi-stim scan can be referred to as a stimulation matrix (stim matrix). During each step of a multi-stim scan of the touch sensor panel, each MUX 601 can select (e.g., based on the stim matrix) one of stimulation signals for transmission to a corresponding drive line of the touch panel sensor. As illustrated in FIG. 6, the stim matrix 606 can be represented as a table and can include control information for each MUX 601 for each scan step. For example, each scan step of stim matrix 606 can correspond to one step in the scan, and the data values in the column labeled "Tx Polarity" can specify the selections of drive signals for each Tx output block. The entries in Tx Polarity can correspond to selection of the MUX inputs including ground or a common mode voltage. At each step of the multi-stim scan, the MUXs can select different signal combinations to stimulate the touch sensor panel. Scan engine 210 can control the timing of the steps, for example, by incrementing a step address stored in RAM 212.

The output from each MUX 601 can be coupled to the input of the corresponding buffer 603. Buffers 603 of the Tx output blocks 610 can have a unity gain or a different gain depending on the desired stimulation voltage level and the voltage level of the signals on bus 639. Buffers 603 can also to provide the capability to drive the mostly capacitive load presented to them by the touch sensor panel and can reduce some noise from the transmit section.

In some examples, the outputs of the Tx DAC 629 can be coupled to separate lines of analog bus 639. In other examples, the circuitry of FIG. 6 can also include DAC buffers 602 and 604 to compensate for different path lengths of the various sensing nodes. Each DAC buffer can be coupled to one of the two outputs of Tx DAC 629 at its input, and its output can be coupled to bus 639. The DAC buffers 602 and 604 can be coupled to Tx Logic 627. DAC buffers 602 and 604 can be used to control the gain applied to the positive phase drive signal and the negative phase drive signal. The gain can be controlled such that the effects due to the difference in signal path experienced by both the positive phase drive signal and the negative phase drive signal can be mitigated. The values of gain for DAC buffers 602 and 604 that produce the minimum amount of charge (i.e., closest to zero) can be empirically determined and can be stored in stim matrix 606. The stim matrix 606 can contain the optimal gain for DAC buffer 604 (the positive signal buffer), denoted by GAIN_P in FIG. 6. The stim matrix 606 can also store the optimal gain for DAC buffer 602 (the negative signal buffer) denoted as GAIN_N in the matrix illustrated in FIG. 6. During each scan step, the gains GAIN_P and GAIN_N corresponding to the particular scan step can be accessed from stim matrix 606 and applied to the DAC buffers 602 and 604. The gain values can be determined at factory calibration or can be determined dynamically when the device can determine that no-touch is present on the device.

Figure 7:
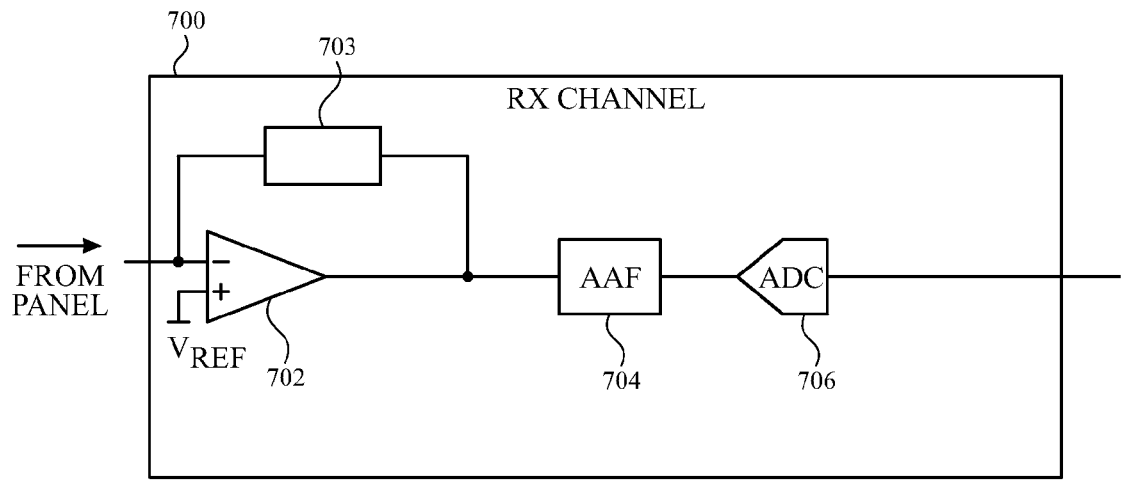
FIG. 7 illustrates an example sense channel according to examples of the disclosure.

The sense signals received from the multi-stim scan of the touch sensor panel can be demodulated and decoded. In some examples, generating measurements can involve a two stage process including a first-stage signal demodulation and a second-stage vector/matrix operation. The sense signals can be received at sense channels in the receive section 208 coupled to sense lines of the touch sensor panel. FIG. 7 illustrates an example sense channel according to examples of the disclosure. Sense channel 700 (also referred to as receive channel or Rx channel) can include an amplifier 702 with feedback network 703, an anti-alias filter (AAF) 704, and an analog-to-digital converter (ADC) 706. It is to be understood that sense channel 700 is not limited to the components and configuration of FIG. 7, but can include other or additional components in multiple configurations.

In each step of the scan, amplifier 702 of sense channel 700 can receive a composite signal charge from a sense line and convert the charge into a voltage measurement. In addition, offset compensation can be incorporated before or as part of amplifier 702 to remove large voltage offsets that can be outside the dynamic input range of the charge amplifier 702 (dynamic input range can refer to the maximum signal magnitude that the amplifier can accept before the charge amplifier saturates). The output of charge amplifier 702 can be coupled to AAF 704, which can attenuate noise components above the nyquist sampling limit of the ADC sufficiently to prevent those components from aliasing back into the operating frequency range of the touch controller. Furthermore, AAF 704 can attenuate any noise outside the frequency operating range of the touch controller and therefore can help to improve the signal-to-noise ratio (SNR). The output of AAF 704 can be converted by ADC 706 into a digital signal, which can be digitally demodulated. For example, the digital demodulation can include a homodyne mixing process in which the signal can be multiplied with a demodulation signal of the same frequency. In order to increase the efficiency of the mixing process, it can be desirable to adjust the phase of the sense channel output signal to match the phase of the demodulation signal. The mixer output can be integrated by an integrator (and in some cases scaled) to generate a composite output values for the channel and step. The composite output value for each step can be decoded based on the polarity of the stimulation signals used to drive the touch sensor panel (e.g., an inverse of the stimulation matrix) to derive component values for each touch sensing node measured by the channel. The component values can be posted to memory (e.g., RAM 212), where they can be read and/or processed by the one or more touch processors 202, host processor 228, etc., for example.

The transmit and receive sections of the touch controller ASIC can introduce noise into the touch system that can interfere with touch sensing measurements. The noise introduced by the touch controller ASIC can require the touch controller ASIC to be designed with a higher SNR requirement in order to properly perform touch sensing measurements. Some noise introduced by the touch controller ASIC can be correlated noise and some noise introduced by the controller ASIC can be uncorrelated noise. For example, the Tx DAC 629 and Tx ADC 706 (e.g., implemented with feedback DAC up-conversion) can introduce low-frequency, correlated noise components ("1/f noise"). These correlated (1/f) noise components due to the Tx DAC can be referred to herein as "Tx common noise" or "Tx 1/f noise" and the correlated (1/f) noise components due to the Rx ADC can be referred to herein as "Rx common noise" or "Rx 1/f noise." Tx common noise from the DAC can be correlated in time and across all electrodes or lines coupled to the transmit section because it can be a low-frequency noise and because the Tx DAC as illustrated in FIG. 6 can be shared by all Tx output blocks. In other words, Tx common noise can be correlated across all touch sensing nodes sharing the common Tx DAC. Rx common noise from the ADC can be correlated in time and across all touch nodes corresponding to a receive channel because it can be a low-frequency noise and because the Rx ADC can be shared by all touch sensing nodes coupled to a receive channel. Each Rx channel can have a separate ADC, so Rx common noise can be uncorrelated between Rx channels.

Additionally, the transmit section and receive section can introduce uncorrelated noise (thermal noise), referred to herein as Tx thermal noise and Rx thermal noise, respectively. Tx thermal noise can be correlated across touch nodes sharing the same Tx line (e.g., across a drive line) or Tx channel because the data captured at each Rx channel simultaneously sensing the Tx line can experience the same Tx thermal noise. Rx thermal noise can be assumed to be uncorrelated or weakly correlated. For a single-stimulation operation, Rx thermal noise can be uncorrelated because each Rx channel measures only one touch sensing node. For a multi-stim operation, Rx thermal noise can be uncorrelated or weakly correlated because the demodulation and decoding process can de-correlate Rx thermal noise from the touch sensing nodes measured by each Rx channel.

Figure 8:
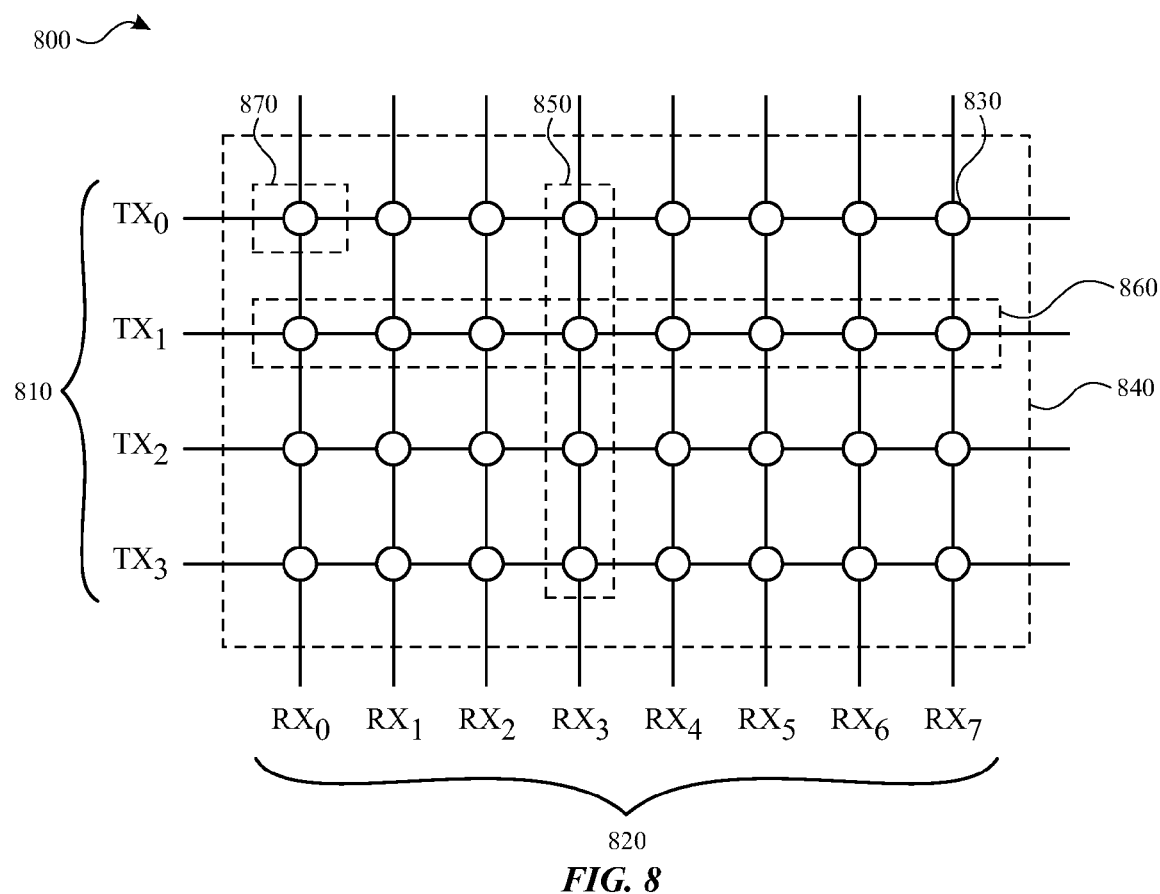
FIG. 8 illustrates examples of correlations between touch sensing nodes and various noise sources according to examples of the disclosure.

FIG. 8 illustrates examples of correlations between touch sensing nodes and various noise sources according to examples of the disclosure. FIG. 8 illustrates a touch sensor panel 800 including drive lines 810 (coupled to Tx channels Tx0-Tx3) and sense lines 820 (coupled to Rx channels Rx0-Rx7) forming a plurality of touch sensing nodes, such as touch sensing node 830. Tx common noise can be correlated for each touch node stimulated by the common Tx DAC, or all touch nodes in region 840 assuming one common Tx DAC for drive lines coupled to Tx0-Tx3. Rx common noise can be correlated for each touch sensing node coupled to a receive channel, assuming one Rx ADC for each of Rx channels Rx0-Rx7. For example, the touch sensing nodes in region 850 can be impacted by Rx common noise due to the ADC in Rx channel Rx3 Likewise, the touch sensing nodes for each Rx channel can be impacted by Rx common noise for the sense line coupled to the Rx channel. Tx thermal noise can be correlated in time for touch nodes on a drive line coupled to a Tx channel due to simultaneous sampling by the Rx channels. For example, the touch sensing nodes in region 860 can be impacted by Tx thermal noise. Likewise, the touch sensing nodes for each Tx channel can be impacted by thermal noise for the drive line coupled to the Tx channel. Rx thermal noise can be weakly correlated or uncorrelated, and thus Rx thermal noise can be localized to each touch sensing node, such as the touch sensing node in region 870.

Mitigating correlated and uncorrelated noise from sources of noise introduced by the touch controller ASIC can allow designers to reduce the SNR requirements for a touch controller ASIC. Alternatively, mitigating noise can allow a touch controller ASIC with given SNR requirements to operate in a touch sensing environment for which the touch controller ASICs SNR can be otherwise insufficient. For example, increasing scan time (and integration time) can reduce the contributions of thermal noise and increase SNR by a factor of $\sqrt{N}$, where N can correspond to the number of samples taken during integration (i.e., four times the number of samples can double SNR). Common 1/f noise, however, can be correlated across many touch nodes and can be amplified when summed at each Rx channel during scanning.

Figure 9:
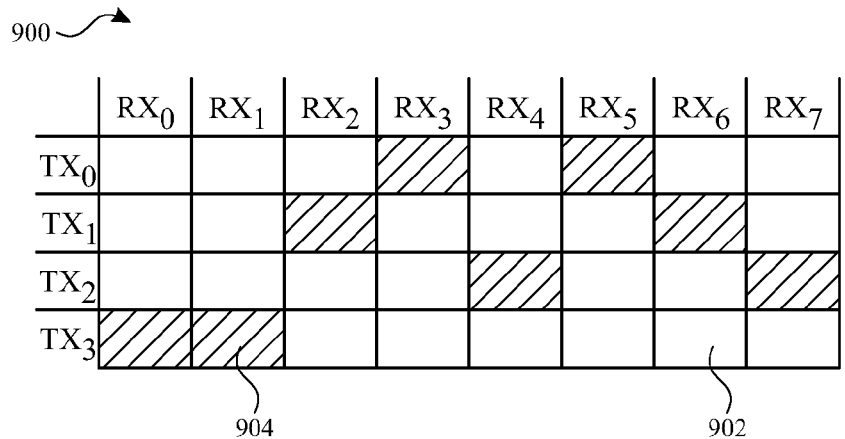
FIG. 9 illustrates an example touch sensor panel for implementing a common pixel correction algorithm according to examples of the disclosure.

In some examples, a common pixel correction algorithm (or common node correction algorithm) can be used to cancel 1/f noise from the transmit section and receive section. A reference node (reference pixel) can be added for each Rx channel, or alternatively can replace a touch sensing node for each Rx channel. The reference node and touch sensing nodes can experience the same Tx and Rx common noise. As a result, subtracting the measurements of the reference nodes from the measurements of the touch sensing nodes can cancel out the Tx and Rx common noise. FIG. 9 illustrates an example touch sensor panel for implementing a common pixel correction algorithm according to examples of the disclosure. Example touch sensor panel 900 includes an array of sensing nodes sensing capacitances formed between Tx and Rx channels. The touch sensor panel illustrated in FIG. 9 includes four Tx channels and eight Rx channels for a total of 24 nodes, each node represented by a box (e.g., such as box 902). In the example illustrated in FIG. 9, one node per Rx channel can be replaced with a reference node, illustrated by shaded box (e.g., such as box 904). After sensing the capacitance at each sensing node and reference node, the system can subtract the measured value corresponding to the capacitance at the reference node for an Rx channel from the measured capacitance at the sensing nodes of the same Rx channel. This process can be repeated for each Rx channel to mitigate noise from Rx and Tx common noise.

It should be understood that although illustrated as a rectangle of sensing nodes with reference nodes interspersed therein, the touch sensor panel sensing nodes can be arranged to form the touch sensitive region of the device and the reference nodes can be outside the touch sensitive region. The representation can simplify the view of various distributions of sensing nodes and reference nodes among Tx channels and Rx channels.

The common pixel correction algorithm can be represented mathematically as:

$$C_{c(i,j)} = C_{m(i,j)} - \frac{C_{b(i,j)}}{C_{b(r,j)}} C_{m(r,j)},$$

where $C_{c(i,j)}$ can represent the corrected measurement at the sensing node formed by the $i^{th}$ Tx channel and the $j^{th}$ Rx channel, $C_{m(i,j)}$ can represent the raw measurement at the sensing node formed by the $i^{th}$ Tx channel and the $j^{th}$ Rx channel, $C_{m(r,j)}$ can represent the measurement at the reference node for the $j^{th}$ Rx channel, $C_{b(i,j)}$ can represent a baseline measurement at the sensing node formed between the $i^{th}$ Tx channel and the $j^{th}$ Rx channel, and $C_{b(r,j)}$ can represent a baseline measurement at the reference node for the $j^{th}$ Rx channel. Assuming identical sensing nodes and reference nodes, the baseline parameters can be the same and therefore the scaling parameter, $$\frac{C_{b(i,j)}}{C_{b(r,j)}},$$

can be unity (and ignored). In practice, however, differences between the sensing nodes and the reference nodes (node gain difference or pixel gain difference), can reduce the effectiveness of the common pixel correction algorithm. The baseline scaling parameter can account for differences between sensing nodes and reference nodes on a per-node (per-pixel) basis. For example, $C_{b(i,j)}$ can represent the baseline measurement at the sensing node formed between the $i^{th}$ Tx channel and the $j^{th}$ Rx channel (i.e., when no object is touching or applying force to the sensing nodes). $C_{b(r,j)}$ can represent the baseline measurement at the reference node. The reference nodes can be designed to reduce the effects of user inputs (e.g., touch or force) on the measurements as described in more detail herein.

Although described herein as using baseline values on a per-pixel basis, in other examples the baseline scaling parameter can be defined on a per-Rx channel basis (e.g., one scaling parameter for each Rx channel) or on a global basis (e.g., one scaling parameter for the panel). Alternatively, the baseline scaling parameters can use an average or otherwise determined baseline value for reference nodes or an average or otherwise determined baseline value for the sensing nodes of an Rx channel. The scaling parameter can also be different than the examples presented herein to optimize noise cancellation. The baseline values can be determined at calibration and/or dynamically determined during operation (when no object is touching or applying force to the sensing nodes). The baseline values can be stored in memory and accessed by the hardware, firmware or software performing the common pixel correction algorithm.

Figure 10:
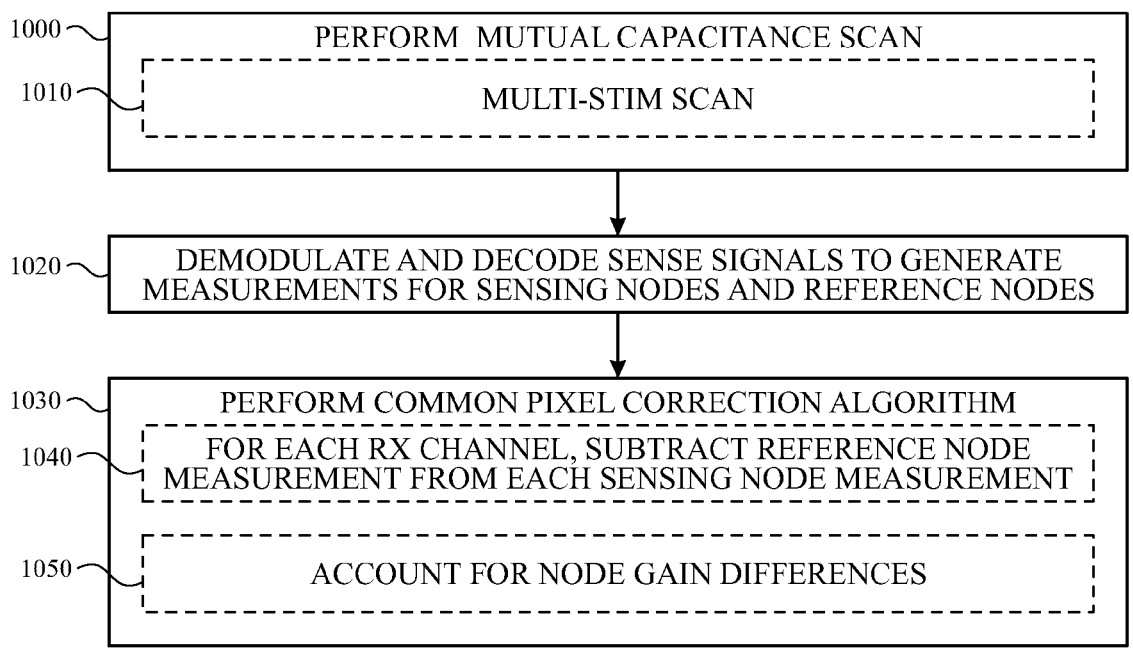
FIG. 10 illustrates an example process for performing a common pixel correction algorithm according to examples of the disclosure.

FIG. 10 illustrates an example process for performing a common pixel correction algorithm according to examples of the disclosure. The system can perform a mutual capacitance scan of the touch sensor panel (1000). For example, the scan can be a single stimulation scan or multi-stim scan as discussed herein (1010). For a system performing a multi-stim, the system can demodulate and decode the sense signals received at the Rx channels to generate measurements (e.g., touch values) for the sensing nodes and reference nodes (1020). If the system performs a single stimulation scan, decoding can be unnecessary. The system can then perform the common pixel correction algorithm (1030). The algorithm can, for each Rx channel, adjust the measurements at the sensing nodes (e.g., touch values) by subtracting the measurements at the reference node from each sensing node measurement (1040). In some examples, to account for differences between the reference nodes and sensing nodes, the measurement of the reference node can be scaled using a scaling parameter before subtracting to account for gain difference between the nodes (1050).

Reference nodes can be part of the existing sensor circuitry or can be independent of existing sensor circuitry. For example, in some implementations, a reference node can be formed to sense the mutual capacitance between a drive line and a sense line, where the node can be isolated or otherwise shielded from the effects on mutual capacitance due to an object touching, proximate, or applying force at the reference node. Such an implementation makes use of the existing traces for drive and sense lines, but uses isolation or shielding to make a sensing node into a reference node. In other examples, a capacitor can be added (e.g., a discrete capacitor that can be mounted on a printed circuit board) and wired between a Tx channel and an Rx channel.

Although described herein as a touch sensor panel, the sensor panel can also be configured to measure other types of input using capacitance measurements. For example, the sensor panel can detect changes in force based on changes in mutual capacitance due to displacement of some electrodes of the sensor panel relative to other electrodes of the sensor panel.

Figure 11A:
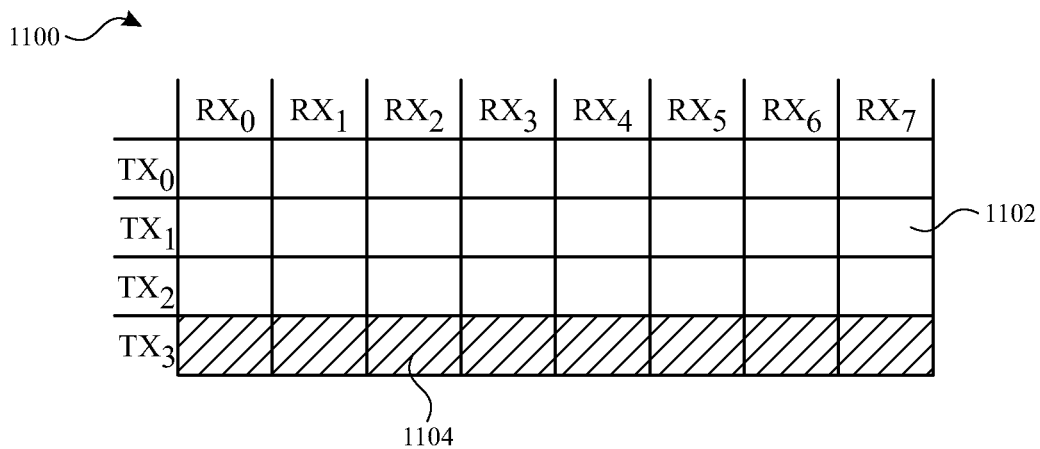
FIG. 11A illustrates another example touch sensor panel for implementing a common pixel correction algorithm according to examples of the disclosure.

FIG. 11A illustrates another example touch sensor panel for implementing a common pixel correction algorithm according to examples of the disclosure. Example touch sensor panel 1100, like the example touch sensor panel 900 in FIG. 9, includes an array of 24 nodes (represented by a box, such as box 1102) sensing capacitances formed between four Tx channels and eight Rx channels. Additionally, like the example illustrated in FIG. 9, in FIG. 11A one sensing node per Rx channel can be replaced with a reference node, illustrated by a shaded box (e.g., such as box 1104). Unlike in the example illustrated in FIG. 9 which evenly divides reference nodes among the Tx channels (2 reference pixels per Tx line), in the example illustrated in FIG. 11A, the reference nodes can be common to one Tx channel (i.e., Tx3). After sensing the capacitance at each sensing node and reference node, the system can subtract the measured capacitance at the reference node for an Rx channel from the measured capacitance at the sensing nodes of the same Rx channel. This process can be repeated for each Rx channel to mitigate noise from Rx and Tx common noise.

Figure 11B:
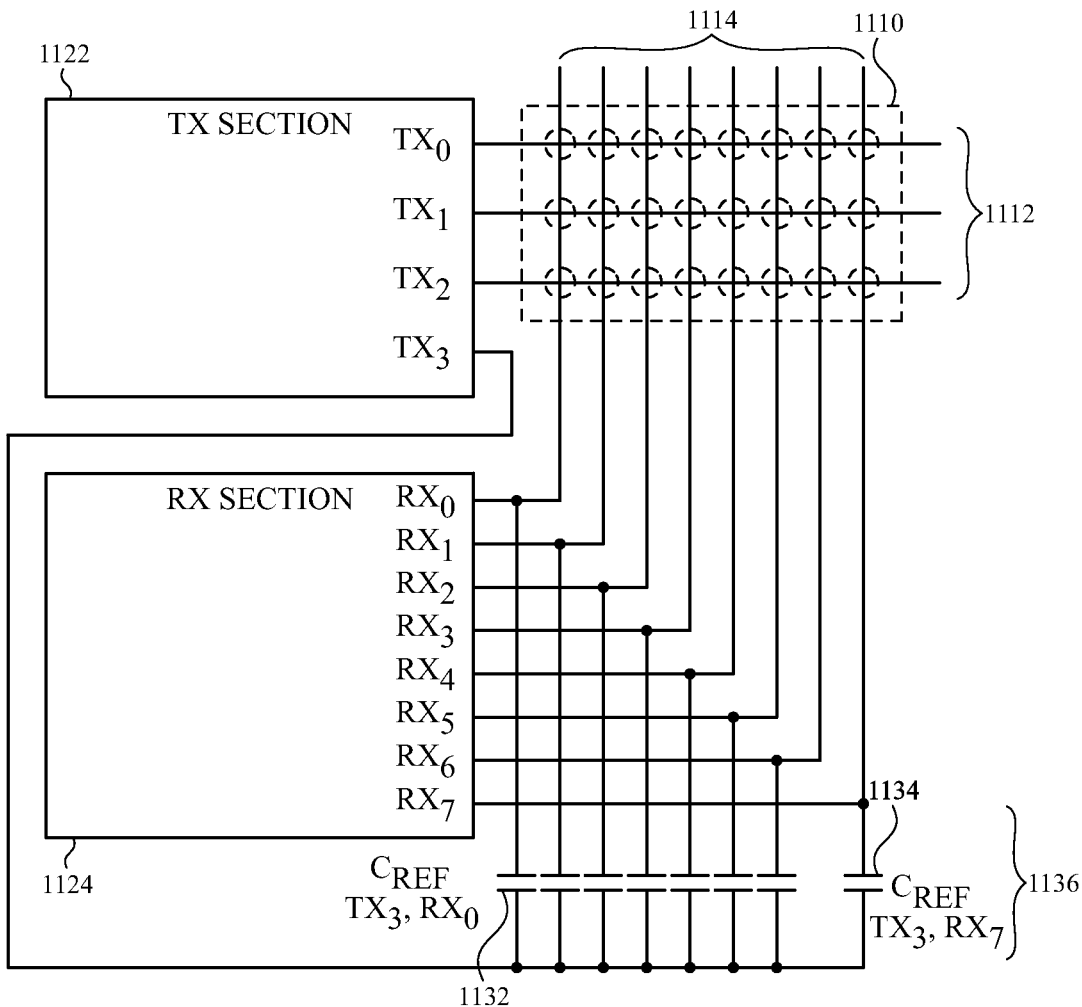
FIG. 11B illustrates an example touch sensor panel for implementing a common pixel correction algorithm using discrete reference capacitors according to examples of the disclosure.

FIG. 11B illustrates an example touch sensor panel for implementing a common pixel correction algorithm using discrete reference capacitors according to examples of the disclosure. FIG. 11B illustrates an example touch sensor panel 1110 including an array of 24 nodes represented by the nodes at the crossing or adjacencies of drive lines 1112 and sense lines 1114. Drive lines 1112 can be coupled to transmit channels Tx0-Tx2 of the transmit section 1122 and sense lines 1114 can be coupled to receive channels Rx0-Rx7 of the receive section 1124. Discrete reference capacitors 1130 can be coupled between transmit channel Tx3 and the receive channels Rx0-Rx7. For example, capacitor 1132, $C_{REF,Tx3,Rx0}$, can be a reference node for receive channel Rx0 and capacitor 1134, $C_{REF,Tx3,Rx7}$, can be a reference node for receive channel Rx7. The discrete capacitors can be mounted on a PCB, for example, and can be independent from the touch-sensitive area of touch sensor panel 1110. After sensing the capacitance at each sensing node and reference node (i.e., discrete reference capacitors 1130), the system can subtract the measured capacitance at the reference node for an Rx channel from the measured capacitance at the sensing nodes of the same Rx channel. This process can be repeated for each Rx channel to mitigate noise from Rx and Tx common noise. It should be understood that the examples herein can be implemented using discrete capacitors as described with reference to FIG. 11B to implement the reference nodes for the respective examples.

In addition to correcting for common 1/f noise and other correlated noise, the arrangement of reference nodes in FIG. 9 can reduce Tx thermal noise as well. FIG. 12 illustrates thermal noise contributions at nodes of the example touch sensor panel 900 illustrated in FIG. 9 according to examples of the disclosure. For each reference node, the Tx thermal noise contribution can be represented by $\sigma$. For each sensing node, the Tx thermal noise contribution can be represented by $-3\sigma$ because the noise can be subtracted from each of the three sensing nodes in the corresponding Rx channel, as discussed above. Summing the noise along Tx lines can also result in a cancellation of Tx noise (for example, in cases when summing the measurements at all nodes). For each Tx line illustrated in FIG. 12, 6 sensing nodes contribute $6\sigma$ of thermal noise and two reference nodes contribute $-6\sigma$ of thermal noise, resulting in a cancellation of Tx thermal noise. In contrast, FIG. 13 illustrates thermal noise contributions at nodes of the example touch sensor panel 1100 illustrated in FIG. 11A according to examples of the disclosure. Summing the noise along Tx lines can amplify Tx thermal noise. For Tx lines Tx0-Tx2 illustrated in FIG. 13, the 8 sensing nodes can contribute $8\sigma$ of thermal noise resulting in an 8× amplification of Tx thermal noise. For Tx line Tx3 illustrated in FIG. 13, the 8 reference nodes can contribute $-24\sigma$ of thermal noise resulting in a 24× amplification of Tx thermal noise.

To generalize, when the reference nodes are distributed evenly among the Tx channels, the Tx thermal noise can be canceled along the Tx lines. For example, the Tx thermal noise can cancel when using a 4×8 touch sensor panel illustrated in FIG. 12 and also in a 4×4 or a 4×16 touch sensor panel as well. Additionally, the scheme can also work for a 3×3, 3×6, 3×9, etc. touch sensor panel.

The distributions of reference pixels in FIGS. 9 and 11 are representative, but other distributions could be employed. For example, the distribution of reference pixels can be evenly distributed among Tx channels and Rx channels in patterns different than the pattern of FIG. 9. The distribution can also be along other Tx lines than the Tx line shown in FIG. 11A. Additionally, other distributions are possible that including mixing properties of the distributions of FIGS. 9 and 11. The design choice of distributing reference pixels can be constrained by cost or other hardware constraints.

FIGS. 9 and 11-13 show a 3:1 ratio of sensing nodes to reference nodes. However different ratios of sensing nodes to reference nodes can be used, such as a 1:1 ratio, or a 10:1 ratio, etc. Reference pixels can be used multiple times to correct each sensing node in an Rx channel so it can amplify the Tx thermal noise. A tradeoff can be made between the number of reference pixels and the thermal noise for the configuration in FIGS. 11 and 13. More reference capacitors can improve thermal noise cancellation, but can add cost and occupy more area in the device.

As touch sensor panel sizes scale, the ratio of sensing nodes to reference nodes can increase, resulting in increased thermal noise. One way to reduce noise without increasing the number of reference nodes can be to implement a banked scan.

FIG. 14 illustrates an example touch sensor panel for implementing a common pixel correction algorithm using banked scans according to examples of the disclosure. Example touch sensor panel 1400 can include 256 nodes corresponding to 16 Tx channels (Tx0-Tx15) and 16 Rx channels (Rx0-Rx15). Rather than performing a 16×16 scan, i.e., a multi-stim scan including simultaneously stimulating the touch sensor panel using 16 Tx channels for 16 steps of the scan, and using the reference nodes coupled to Tx15, 15 times (which can amplify the Tx thermal noise to up to 240σ), the panel can be scanned in banks. Each bank can include multiple sensing nodes and the reference nodes coupled to Tx15. For example, during a first 4×4 scan, i.e., a multi-stim scan including simultaneously stimulating using 4 Tx channels for 4 steps of the scan, bank 1 including sensing nodes along Tx0, Tx1, Tx2 and reference nodes along Tx15 can be scanned. During a second 4×4 scan, bank 2 including nodes of Tx3, Tx4, Tx5 and Tx15 can be scanned. During a third 4×4 scan, bank 3 including nodes of Tx6, Tx7, Tx8 and Tx15 can be scanned. During a fourth 4×4 scan, bank 4 including nodes of Tx9, Tx10, Tx11 and Tx15 can be scanned. During a fifth 4×4 scan, bank 5 including nodes of Tx12, Tx13, Tx14 and Tx15 can be scanned. At the conclusion of each banked scan (or at the conclusion of all banked scans) the sense signals for each bank can be demodulated and decoded to generate measurements for each sensing node and each reference node corresponding to the capacitances at the nodes. The reference measurements at Tx15 corresponding to each bank can be generated and subtracted from the sensing node measurements of the corresponding bank. As a result, the noise performance for each bank scan can be similar to the noise performance of the touch sensor panels in FIGS. 12 and 13 that have of a 3:1 ratio of sensing nodes to reference nodes per Rx channel. Even though Tx thermal noise can increase due to the shortened duration of the 4×4 scans (as compared with a 16×16 scan), the Tx thermal noise for each bank can be uncorrelated (scanned at different times) which can reduce the amplification of thermal noise.

Alternatively, more reference nodes can be added to reduce the noise amplification. For example, rather than coupling reference nodes between Tx15 and Rx0-Rx15, reference nodes can be coupled between 4 Tx channels and Rx0-15. The sensing nodes for the remaining 12 Tx channels can be scanned along with the reference nodes of the 4 Tx channels using a 16×16 scan. By maintain the 3:1 ratio of reference nodes to sensing nodes, the Tx thermal noise amplification can be reduced compared with having reference nodes along one Tx line (15:1 ratio).

Figure 15:
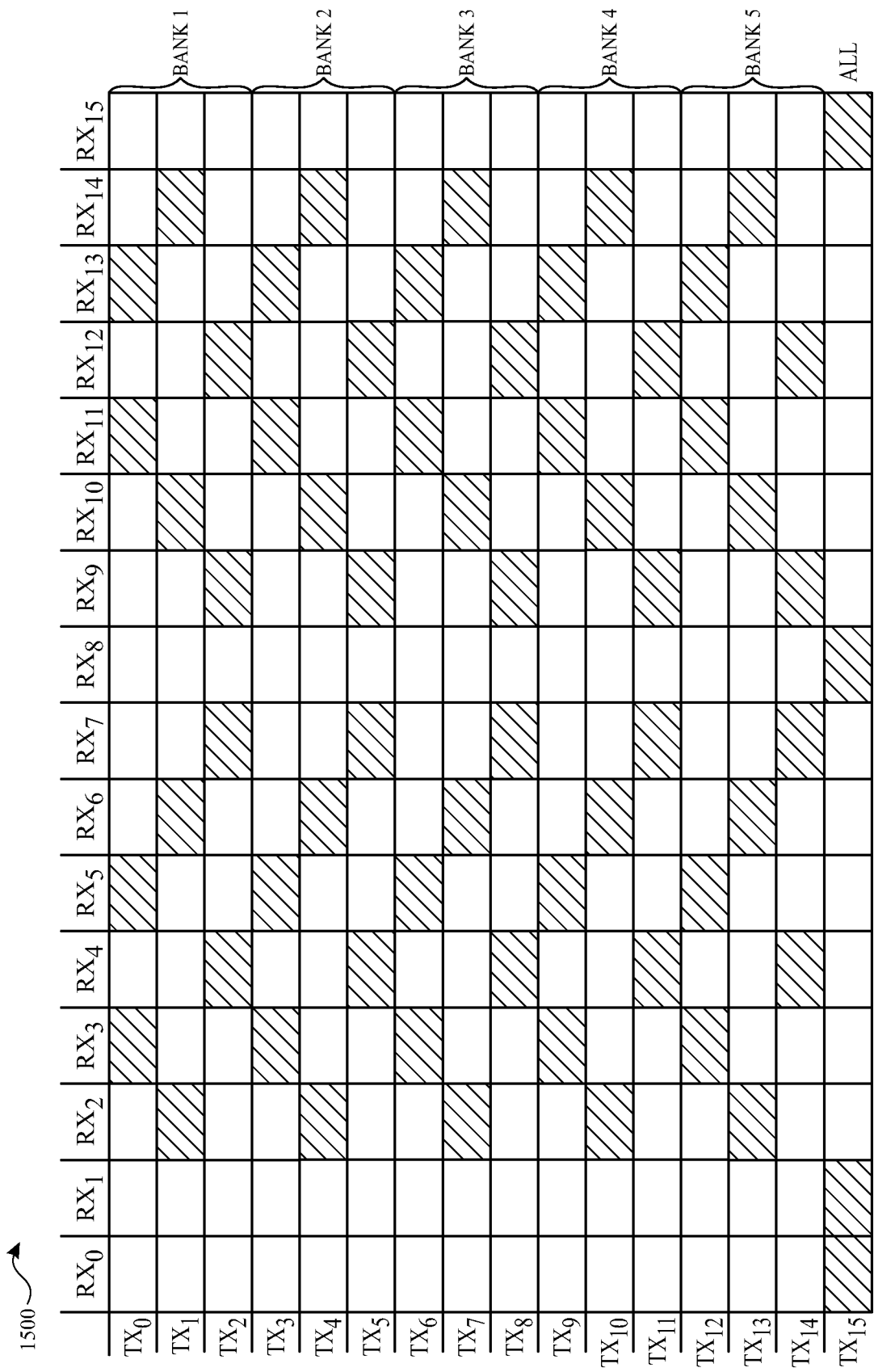
FIG. 15 illustrates another example touch sensor panel for implementing a common pixel correction algorithm using banked scans according to examples of the disclosure.

Banked scans can also be used for the distribution of reference nodes illustrated in FIGS. 9 and 12. FIG. 15 illustrates another example touch sensor panel for implementing a common pixel correction algorithm using banked scans according to examples of the disclosure. Example touch sensor panel 1500 can include 256 nodes corresponding to 16 Tx channels (Tx0-Tx15) and 16 Rx channels (Rx0-Rx15). For each bank, the reference nodes can be evenly distributed among the Tx and Rx channels. For example, during a first 4×4 scan, bank 1, which can include the nodes of Tx0, Tx1, Tx2 and Tx15, can be scanned, and the reference nodes can be distributed evenly among Tx and Rx (4 reference nodes per Tx channel and 1 reference node per Rx channel). During a second 4×4 scan, bank 2, which can include the nodes of Tx3, Tx4, Tx5 and Tx15, can be scanned, and the reference nodes can be distributed evenly among Tx and Rx (4 reference nodes per Tx channel and 1 reference node per Rx channel). Likewise the remaining banks can also be scanned using Tx15 as the fourth Tx channel during the remaining banked scans. Although the distribution of reference nodes illustrated in each bank of touch sensor panel 1500 in FIG. 15 is the same, the distribution of reference nodes can be different between banks. However, in order to benefit from noise cancellation, the reference nodes for the banks must be compatible with the distribution of reference nodes selected along Tx15.

Figure 16:
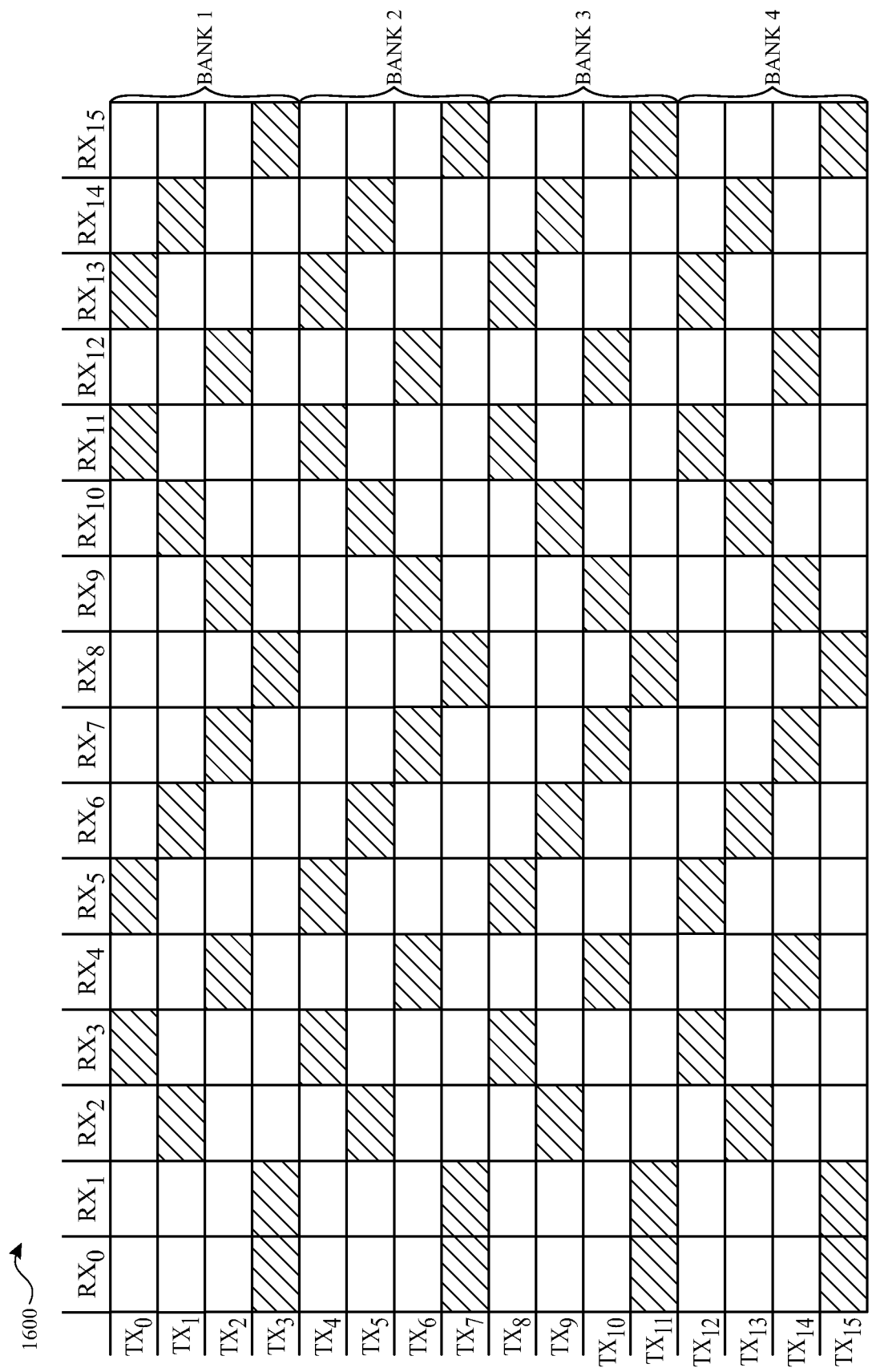
FIG. 16 illustrates another example touch sensor panel for implementing a common pixel correction algorithm according to examples of the disclosure.

Alternatively, the reference nodes can be distributed evenly among the Tx channels and Rx channels and a 16×16 scan can be performed. FIG. 16 illustrates another example touch sensor panel for implementing a common pixel correction algorithm according to examples of the disclosure. For example, example touch sensor panel 1600 can include 16 Tx channels and 16 Rx channels. The reference nodes can be distributed evenly among the Tx and Rx channels. The ratio of sensing nodes to reference nodes can be 3:1 such that a 16×16 scan of the panel can have the same noise performance as the distribution in FIGS. 9 and 12. In some examples, 4×4 bank scans can be performed, where each bank can have a 3:1 ratio of sensing nodes to reference nodes.

Figures 17, 18:
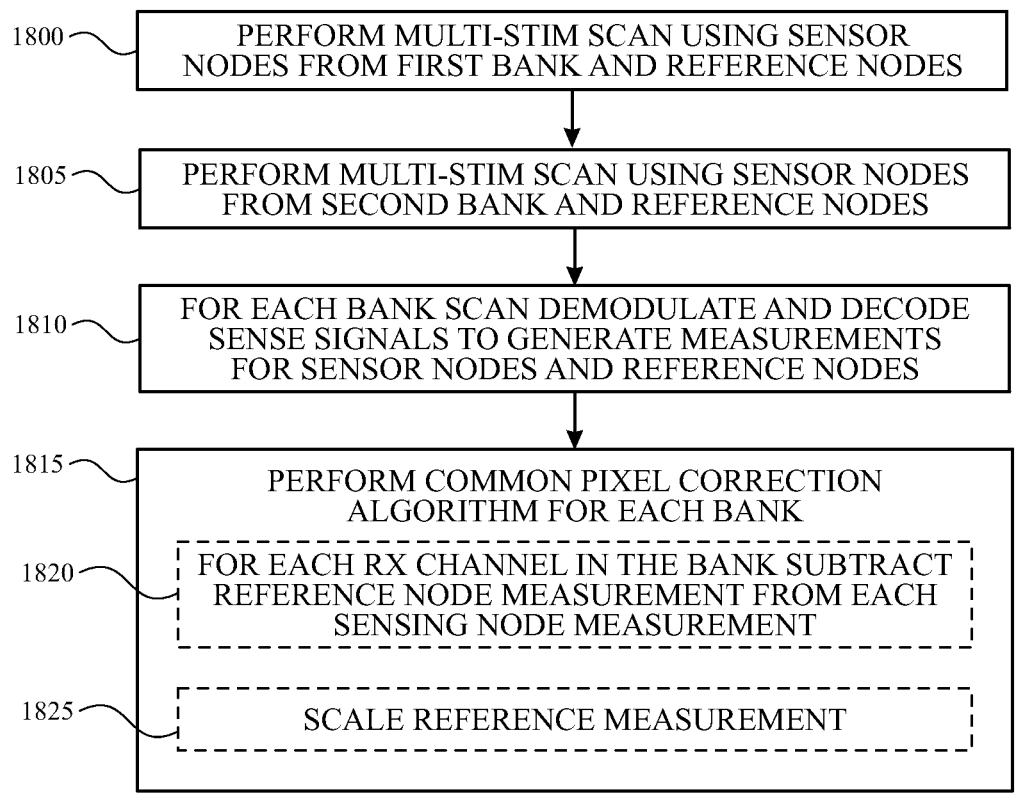
FIG. 17 illustrates an example touch sensor panel including mixed distributions of reference nodes according to examples of the disclosure.
FIG. 18 illustrates another example process for performing a common pixel correction algorithm according to examples of the disclosure.

In some examples, the touch sensor panel can include a portion having a distribution of reference nodes as in FIG. 9 and another portion having a distribution of reference nodes as in FIG. 11A. FIG. 17 illustrates an example touch sensor panel including mixed distributions of reference nodes according to examples of the disclosure. FIG. 17 illustrates a touch sensor panel including 8 Rx channels and 8 Tx channels divided into two banks. In a first bank, the reference nodes can be distributed according to the distribution of FIG. 9. In a second bank, the reference nodes can be distributed according to the distribution of FIG. 11A. In some cases, the two banks can be scanned simultaneously (an 8×8 multi-stim scan) and the common pixel correction algorithms can be applied simultaneously. In other examples, the two banks can be scanned and the common pixel correction algorithms can be applied in series. Although two banks are illustrated in FIG. 17, the mixed distributions of reference nodes can be applied to the touch sensor panel in additional banks or without dividing the panel into banks.

FIG. 18 illustrates another example process for performing a common pixel correction algorithm according to examples of the disclosure. The system can perform a mutual capacitance scan of a first bank of the touch sensor panel (1800). The first bank of the touch sensor panel can include, for example, sensing nodes corresponding to three Tx lines (e.g., Tx0-Tx2 in FIG. 14) and reference nodes corresponding to one Tx line (e.g., Tx15 in FIG. 14). The mutual capacitance scan of the first bank can be a multi-stim scan as discussed herein. The system can perform a mutual capacitance scan of a second bank of the touch sensor panel (1805). The second bank of the touch sensor panel can include, for example, sensing nodes corresponding to three Tx lines (e.g., Tx3-Tx5 in FIG. 14) and reference nodes corresponding to one Tx line (e.g., Tx15 in FIG. 14). The mutual capacitance scan of the second bank can also be a multi-stim scan as discussed herein. In some examples, one Tx channel can be dedicated for reference nodes, though in other examples, more than one Tx channel can be dedicated for reference nodes or the reference nodes can be distributed differently. Any additional banks can be scanned in a similar fashion as bank 1 and bank 2. For each bank scan, the sense signals received can be demodulated and decoded to generate measurements (e.g., touch values) for the sensing nodes and reference nodes (1810). The system can perform the common pixel correction algorithm for each bank (1815). The algorithm can, for each Rx channel in the bank, adjust the measurements at the sensing nodes (e.g., touch values) by subtracting the measurements at the reference node from each sensing node measurement (1820). In some examples, to account for difference between the reference nodes and sensing nodes, the measurement of the reference node can be scaled before subtracting to account for gain difference between the nodes (1825). The scaling parameters can be a ratio of baseline values that can be applied on a per-pixel basis.

Although the disclosed examples have been fully described with reference to mutual capacitance based touch sensor panels (e.g., row-column or pixelated), it is to be understood that common pixel correction techniques described herein can be applied to other touch sensor panels including other types of capacitive based touch sensor panels (e.g., self-capacitance based), resistive touch sensor panels, or the like. It is apparent to those skilled in the art that for different sensing technologies, modifications would be made to accommodate the sensing technology. For example, for a resistive touch sensor panel, the sensor nodes can be implemented with resistive sensors and the reference nodes can be implemented with resistive references sensors.

Therefore, according to the above, some examples of the disclosure are directed to an apparatus. The apparatus can comprise, a plurality of transmit channels configured to stimulate a sensor panel, a plurality of receive channels configured to receive sense signals from the sensor panel, and processing circuitry capable of: sensing a plurality of sensor nodes of the sensor panel, each sensor node coupled to one of the plurality of transmit channels and coupled to one of the plurality of receive channels, sensing a plurality of reference nodes, each of the plurality of reference nodes coupled between one of the plurality of transmit channels and one of the plurality of receive channels; and subtracting, for each sensor node coupled to a corresponding receive channel, a measurement from sensing the reference node coupled to the corresponding receive channel from a measurement of each of the plurality of sensor nodes. Additionally or alternatively to one or more of the examples disclosed above, the apparatus can comprise a touch sensor panel coupled to one or more of the plurality of sense channels and one or more of the plurality of receive channels. The plurality of transmit channels can be configured to stimulate the touch sensor panel and the plurality of receive channels can be configured to receive sense signals from the touch sensor panel. Additionally or alternatively to one or more of the examples disclosed above, the apparatus can comprise a force sensor panel coupled one or more of the plurality of sense channels and one or more of the plurality of receive channels. The plurality of transmit channels can be configured to stimulate the force sensor panel and the plurality of receive channels can be configured to receive sense signals from the force sensor panel. Additionally or alternatively to one or more of the examples disclosed above, sensing the plurality of sensor nodes can comprise measuring, for each sensor node, capacitive coupling between a first electrode coupled to one of the plurality of transmit channels and a second electrode coupled to one of the plurality of receive channels. Additionally or alternatively to one or more of the examples disclosed above, sensing the plurality of sensor nodes and sensing the plurality of reference nodes can comprise simultaneously stimulating the plurality of sensor nodes and the plurality of reference nodes, receiving the sense signals at the plurality of receive channels, and demodulating and decoding the received sense signals to derive measurements for the plurality of sensor nodes and the plurality of reference nodes. Additionally or alternatively to one or more of the examples disclosed above, the processing circuitry can be further capable of scaling the measurement from sensing the reference node using a ratio of a baseline measurement of the sensor node to a baseline measurement of the reference node. Additionally or alternatively to one or more of the examples disclosed above, the ratio of the baseline measurement of the sensor node to the baseline measurement of the reference node used for scaling the measurement from sensing the reference node can be unique for a corresponding sensing node. Additionally or alternatively to one or more of the examples disclosed above, the plurality of reference nodes can be evenly distributed among the plurality of receive channels and evenly distributed among the plurality of transmit channels. Additionally or alternatively to one or more of the examples disclosed above, the plurality of reference nodes can be evenly distributed among the plurality of receive channels. The plurality of reference nodes can distributed to one of the plurality of transmit channels. Additionally or alternatively to one or more of the examples disclosed above, a ratio of sensor nodes to reference nodes for the plurality of channels can be 3:1. Additionally or alternatively to one or more of the examples disclosed above, sensing a reference node can comprise measuring capacitive coupling between a third electrode coupled to one of the plurality of transmit channels and a fourth electrode coupled to one of the plurality of receive channels. The reference node can be shielded from user input. Additionally or alternatively to one or more of the examples disclosed above, a reference node can comprises a discrete capacitor coupled between one of the plurality of transmit channels and one of the plurality of receive channels. Additionally or alternatively to one or more of the examples disclosed above, sensing the plurality of sensor nodes and the plurality of reference nodes can comprises banked scans, wherein a first portion of the plurality of sensor nodes can be scanned with the plurality of reference nodes in a first bank scan and a second portion of the plurality of sensor nodes can be scanned with the plurality of reference nodes in a second bank scan. Additionally or alternatively to one or more of the examples disclosed above, sensing the plurality of sensor nodes can comprise measuring, for each sensor node, a resistance of the sensor node. Additionally or alternatively to one or more of the examples disclosed above, sensing the plurality of sensor nodes can comprise measuring, for each sensor node, a self-capacitance of the sensor node.

Other examples of the disclosure are directed to a method for reducing noise in measurements of a sensor panel executed by one or more processing circuits. The method can comprise sensing a plurality of sensor nodes of the sensor panel, each sensor node coupled to one of a plurality of transmit channels and coupled to one of a plurality of receive channels; sensing a plurality of reference nodes, each of the plurality of reference nodes coupled between a transmit channel and a receive channel; and subtracting, for each sensor node coupled to a corresponding receive channel, a measurement from sensing a reference node coupled to the corresponding receive channel from a measurement of each of the plurality of sensor nodes. Additionally or alternatively to one or more of the examples disclosed above, sensing the plurality of sensor nodes can comprise measuring, for each sensor node, capacitive coupling between a first electrode coupled to one of the plurality of transmit channels and a second electrode coupled to one of the plurality of receive channels. Additionally or alternatively to one or more of the examples disclosed above, sensing the plurality of sensor nodes and sensing the plurality of reference nodes can comprise simultaneously stimulating the plurality of sensor nodes and the plurality of reference nodes, receiving sense signals at the plurality of receive channels, and demodulating and decoding the received sense signals to derive measurements for the plurality of sensor nodes and the plurality of reference nodes. Additionally or alternatively to one or more of the examples disclosed above, the method can further comprise scaling the measurement from sensing the reference node using a ratio of a baseline measurement of the sensor node to a baseline measurement of the reference node. Additionally or alternatively to one or more of the examples disclosed above, the ratio of the baseline measurement of the sensor node to the baseline measurement of the reference node used for scaling the measurement from sensing the reference node can be unique for a corresponding sensing node. Additionally or alternatively to one or more of the examples disclosed above, the plurality of reference nodes are evenly distributed among the plurality of receive channels and evenly distributed among the plurality of transmit channels. Additionally or alternatively to one or more of the examples disclosed above, the plurality of reference nodes can be evenly distributed among the plurality of receive channels. The plurality of reference nodes can be distributed to one of the plurality of transmit channels. Additionally or alternatively to one or more of the examples disclosed above, a ratio of sensor nodes to reference nodes for the plurality of channels can be 3:1. Additionally or alternatively to one or more of the examples disclosed above, sensing a reference node can comprise measuring capacitive coupling between a third electrode coupled to one of the plurality of transmit channels and a fourth electrode coupled to one of the plurality of receive channels. The reference node can be shielded from user input. Additionally or alternatively to one or more of the examples disclosed above, a reference node can comprise a discrete capacitor coupled between one of the plurality of transmit channels and one of the plurality of receive channels. Additionally or alternatively to one or more of the examples disclosed above, sensing the plurality of sensor nodes and the plurality of reference nodes can comprise banked scans, wherein a first portion of the plurality of sensor nodes can be scanned with the plurality of reference nodes in a first bank scan and a second portion of the plurality of sensor nodes can be scanned with the plurality of reference nodes in a second bank scan. Additionally or alternatively to one or more of the examples disclosed above, the sensor panel can be a touch sensor panel. Additionally or alternatively to one or more of the examples disclosed above, the sensor panel can be a force sensor panel. Additionally or alternatively to one or more of the examples disclosed above, sensing the plurality of sensor nodes can comprises measuring, for each sensor node, a resistance of the sensor node. Additionally or alternatively to one or more of the examples disclosed above, sensing the plurality of sensor nodes can comprise measuring, for each sensor node, a self-capacitance of the sensor node.

Some examples of the disclosure are directed to a non-transitory computer readable storage medium. The computer readable medium can contain instructions that, when executed by a device including a processor, can perform a method. The method can comprise sensing a plurality of sensor nodes of the sensor panel, each sensor node coupled to one of a plurality of transmit channels and coupled to one of a plurality of receive channels; sensing a plurality of reference nodes, each of the plurality of reference nodes coupled between a transmit channel and a receive channel; and subtracting, for each sensor node coupled to a corresponding receive channel, a measurement from sensing a reference node coupled to the corresponding receive channel from a measurement of each of the plurality of sensor nodes. Additionally or alternatively to one or more of the examples disclosed above, sensing the plurality of sensor nodes can comprise measuring, for each sensor node, capacitive coupling between a first electrode coupled to one of the plurality of transmit channels and a second electrode coupled to one of the plurality of receive channels. Additionally or alternatively to one or more of the examples disclosed above, sensing the plurality of sensor nodes and sensing the plurality of reference nodes can comprise simultaneously stimulating the plurality of sensor nodes and the plurality of reference nodes, receiving sense signals at the plurality of receive channels, and demodulating and decoding the received sense signals to derive measurements for the plurality of sensor nodes and the plurality of reference nodes. Additionally or alternatively to one or more of the examples disclosed above, the method can further comprise scaling the measurement from sensing the reference node using a ratio of a baseline measurement of the sensor node to a baseline measurement of the reference node. Additionally or alternatively to one or more of the examples disclosed above, the ratio of the baseline measurement of the sensor node to the baseline measurement of the reference node used for scaling the measurement from sensing the reference node can be unique for a corresponding sensing node. Additionally or alternatively to one or more of the examples disclosed above, the plurality of reference nodes are evenly distributed among the plurality of receive channels and evenly distributed among the plurality of transmit channels. Additionally or alternatively to one or more of the examples disclosed above, the plurality of reference nodes can be evenly distributed among the plurality of receive channels. The plurality of reference nodes can be distributed to one of the plurality of transmit channels. Additionally or alternatively to one or more of the examples disclosed above, a ratio of sensor nodes to reference nodes for the plurality of channels can be 3:1. Additionally or alternatively to one or more of the examples disclosed above, sensing a reference node can comprise measuring capacitive coupling between a third electrode coupled to one of the plurality of transmit channels and a fourth electrode coupled to one of the plurality of receive channels. The reference node can be shielded from user input. Additionally or alternatively to one or more of the examples disclosed above, a reference node can comprise a discrete capacitor coupled between one of the plurality of transmit channels and one of the plurality of receive channels. Additionally or alternatively to one or more of the examples disclosed above, sensing the plurality of sensor nodes and the plurality of reference nodes can comprise banked scans, wherein a first portion of the plurality of sensor nodes can be scanned with the plurality of reference nodes in a first bank scan and a second portion of the plurality of sensor nodes can be scanned with the plurality of reference nodes in a second bank scan. Additionally or alternatively to one or more of the examples disclosed above, the device can further comprise a touch sensor panel that includes the plurality of sensor nodes. Additionally or alternatively to one or more of the examples disclosed above, the device can further comprise a force sensor panel that includes the plurality of sensor nodes. Additionally or alternatively to one or more of the examples disclosed above, sensing the plurality of sensor nodes can comprises measuring, for each sensor node, a resistance of the sensor node. Additionally or alternatively to one or more of the examples disclosed above, sensing the plurality of sensor nodes can comprise measuring, for each sensor node, a self-capacitance of the sensor node.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An apparatus comprising:
a plurality of transmit channels configured to stimulate a touch or force sensor panel;
a plurality of receive channels configured to receive sense signals from the touch or force sensor panel; and
processing circuitry capable of:
sensing a plurality of sensor nodes of the touch or force sensor panel, each sensor node coupled to one of the plurality of transmit channels and coupled to one of the plurality of receive channels;
sensing a plurality of reference nodes, each of the plurality of reference nodes coupled between one of the plurality of transmit channels and one of the plurality of receive channels; and
subtracting, for each sensor node coupled to a corresponding receive channel, a measurement from sensing the reference node coupled to the corresponding receive channel from a measurement of each of the plurality of sensor nodes.

2. The apparatus of claim 1, wherein sensing the plurality of sensor nodes comprises measuring, for each sensor node, capacitive coupling between a first electrode coupled to one of the plurality of transmit channels and a second electrode coupled to one of the plurality of receive channels.

3. The apparatus of claim 2, wherein sensing a reference node comprises measuring capacitive coupling between a third electrode coupled to one of the plurality of transmit channels and a fourth electrode coupled to one of the plurality of receive channels, and wherein the reference node is shielded from user input.

4. The apparatus of claim 1, wherein sensing the plurality of sensor nodes and sensing the plurality of reference nodes comprises simultaneously stimulating the plurality of sensor nodes and the plurality of reference nodes, receiving the sense signals at the plurality of receive channels, and demodulating and decoding the received sense signals to derive measurements for the plurality of sensor nodes and the plurality of reference nodes.

5. The apparatus of claim 1, the processing circuitry further capable of scaling the measurement from sensing the reference node using a ratio of a baseline measurement of the sensor node to a baseline measurement of the reference node.

6. The apparatus of claim 5, wherein the ratio of the baseline measurement of the sensor node to the baseline measurement of the reference node used for scaling the measurement from sensing the reference node is unique for a corresponding sensing node.

7. The apparatus of claim 1, wherein the plurality of reference nodes are evenly distributed among the plurality of receive channels and evenly distributed among the plurality of transmit channels.

8. The apparatus of claim 1, wherein the plurality of reference nodes are evenly distributed among the plurality of receive channels, and wherein the plurality of reference nodes are distributed to one of the plurality of transmit channels.

9. The apparatus of claim 1, wherein a reference node comprises a discrete capacitor coupled between one of the plurality of transmit channels and one of the plurality of receive channels.

10. The apparatus of claim 1, wherein sensing the plurality of sensor nodes and the plurality of reference nodes comprises banked scans, wherein a first portion of the plurality of sensor nodes is scanned with the plurality of reference nodes in a first bank scan and a second portion of the plurality of sensor nodes is scanned with the plurality of reference nodes in a second bank scan.

11. A method for reducing noise in measurements of a touch or force sensor panel, comprising:
sensing a plurality of sensor nodes of the touch or force sensor panel, each sensor node coupled to one of a plurality of transmit channels and coupled to one of a plurality of receive channels;
sensing a plurality of reference nodes, each of the plurality of reference nodes coupled between a transmit channel and a receive channel; and
subtracting, for each sensor node coupled to a corresponding receive channel, a measurement from sensing a reference node coupled to the corresponding receive channel from a measurement of each of the plurality of sensor nodes.

12. The method of claim 11, wherein sensing the plurality of sensor nodes comprises measuring, for each sensor node, capacitive coupling between a first electrode coupled to one of the plurality of transmit channels and a second electrode coupled to one of the plurality of receive channels.

13. The method of claim 12, wherein sensing the plurality of sensor nodes and sensing the plurality of reference nodes comprises simultaneously stimulating the plurality of sensor nodes and the plurality of reference nodes, receiving sense signals at the plurality of receive channels, and demodulating and decoding the received sense signals to derive measurements for the plurality of sensor nodes and the plurality of reference nodes.

14. The method of claim 12, further comprising scaling the measurement from sensing the reference node using a ratio of a baseline measurement of the sensor node to a baseline measurement of the reference node.

15. The method of claim 14, wherein the ratio of the baseline measurement of the sensor node to the baseline measurement of the reference node used for scaling the measurement from sensing the reference node is unique for a corresponding sensing node.

16. The method of claim 12, wherein the plurality of reference nodes are evenly distributed among the plurality of receive channels and evenly distributed among the plurality of transmit channels.

17. The method of claim 12, wherein the plurality of reference nodes are evenly distributed among the plurality of receive channels, and wherein the plurality of reference nodes are distributed to one of the plurality of transmit channels.

18. The method of claim 12, wherein sensing a reference node of the plurality of reference nodes comprises measuring capacitive coupling between a third electrode coupled to one of the plurality of transmit channels and a fourth electrode coupled to one of the plurality of receive channels, and wherein the reference node is shielded from user input.

19. The method of claim 12, wherein a reference node comprises a discrete capacitor coupled between one of the plurality of transmit channels and one of the plurality of receive channels.

20. The method of claim 12, wherein sensing the plurality of sensor nodes and the plurality of reference nodes comprises banked scans, wherein a first portion of the plurality of sensor nodes is scanned with the plurality of reference nodes in a first bank scan and a second portion of the plurality of sensor nodes is scanned with the plurality of reference nodes in a second bank scan.

21. A non-transitory computer readable storage medium, the computer readable medium containing instructions that, when executed by a device including a processor, can perform a method for reducing noise in measurements of a touch or force sensor panel, the method comprising:

sensing a plurality of sensor nodes of the touch or force sensor panel, each sensor node coupled to one of a plurality of transmit channels and coupled to one of a plurality of receive channels;

sensing a plurality of reference nodes, each of the plurality of reference nodes coupled between a transmit channel and a receive channel; and subtracting, for each sensor node coupled to a corresponding receive channel, a measurement from sensing a reference node coupled to the corresponding receive channel from a measurement of each of the plurality of sensor nodes.

22. The non-transitory computer readable storage medium of claim 21, wherein sensing the plurality of sensor nodes comprises measuring, for each sensor node, capacitive coupling between a first electrode coupled to one of the plurality of transmit channels and a second electrode coupled to one of the plurality of receive channels.

23. The non-transitory computer readable storage medium of claim 21, further comprising:
scaling the measurement from the reference node using a ratio of a baseline measurement of the sensor node to a baseline measurement of the reference node.

24. The non-transitory computer readable storage medium of claim 21, wherein the plurality of reference nodes are evenly distributed among the plurality of receive channels and evenly distributed among the plurality of transmit channels.

25. The non-transitory computer readable storage medium of claim 21, wherein the plurality of reference nodes are evenly distributed among the plurality of receive channels, and wherein the plurality of reference nodes are distributed to one of the plurality of transmit channels.

* * * * *